United States Patent [19]

Morinaga et al.

[11] 4,212,490
[45] Jul. 15, 1980

[54] HEAD SHELL FOR PICK-UP ARMS AND METHOD OF MAKING SAME

[75] Inventors: Mitsuyoshi Morinaga; Yasuo Kishida, both of Tokyo, Japan

[73] Assignee: Trio Kabushiki Kaisha, Tokyo, Japan

[21] Appl. No.: 941,769

[22] Filed: Sep. 13, 1978

[30] Foreign Application Priority Data

Sep. 14, 1977 [JP] Japan .............................. 52-109945
Sep. 14, 1977 [JP] Japan .............................. 52-109946

[51] Int. Cl.² .................................................. G11B 3/10
[52] U.S. Cl. .......................................... 274/37; 29/517
[58] Field of Search ................ 274/23 R, 37; 29/516, 29/517

[56] References Cited

U.S. PATENT DOCUMENTS

| | | | |
|---|---|---|---|
| 3,233,906 | 2/1966 | Asaff ........................................ | 274/37 |
| 3,909,009 | 9/1975 | Cretko et al. ........................... | 274/37 |
| 3,923,309 | 12/1975 | Nakajima et al. ..................... | 274/23 R |
| 3,961,797 | 6/1976 | Tsukagoshi ............................. | 274/37 |

*Primary Examiner*—Steven L. Stephan
*Attorney, Agent, or Firm*—Gerald J. Ferguson, Jr.; Joseph J. Baker

[57] ABSTRACT

A head shell for pick-up arms and method of making same comprising a flat part for mounting a cartridge formed by machine-pressing a part of a tubular member and a connector mounted at the opening of the remaining tubular part.

5 Claims, 15 Drawing Figures

HEAD SHELL FOR PICK-UP ARMS AND METHOD OF MAKING SAME

BACKGROUND OF THE INVENTION

1. Field of the Invention

This invention relates to an improved head shell for pickup arms and a method of making same.

2. Discussion of the Prior Art

Conventionally, as shown in FIG. 1, head shells comprise a horizontal part 1 for mounting a cartridge and a vertical part 2 formed at the back end of horizontal part 1 for mounting a connector 3. Connector 3 is affixed onto vertical part 2 by means of caulking, screwing, or adhesion. The cross-sectional forms of horizontal part 1 are roughly as shown in FIGS. 2(A), 2(B) and 2(C). As for the material and forming methods, the head shells are made of light alloys of aluminum, magnesium, ceramic, etc. by means of forging, die casting, or plastic molding.

In general, the required characteristics for this type of head shell are lightness, adequate bending and torsional strengths, large dampening factor, etc. In the case of conventional head shells, the lightness requirement is more or less satisfied; however, the bending and torsional strengths have been inadequate. Consequently, as shown at r in the frequency response graph of FIG. 3, partial resonance occurs resulting in an inferior sound quality. This is attributable to the inadequate strength of the head shell in view of the connector 3.

Some head shells made of carbon fiber has been introduced to overcome aforementioned defects. However, one of these shells is made by plastic molding mixed with briefly cut carbon fiber chop, and another is made by using long carbon fiber. In this kind of shell using long carbon fiber, cross-section of the shell is seen in FIG. 2(C), because that of FIG. 2(A) or 2(B) is difficult to form. In the former case, mechanical strength, especially bending elasticity is poor because of briefly cut carbon fiber. In the latter case, mechanical strength is poor because of the hole for mounting a connector in the vertical part 2.

SUMMARY OF THE INVENTION

A primary object of this invention is to eliminate the above-mentioned shortcomings and to provide an improved head shell that can satisfy the required characteristics: namely, one that can prevent shell singing and other occurrences of partial resonance in the frequency response characteristic in an attempt to improve sound quality.

Other objects and advantages of this invention will be apparent from a reading of the following specification and claims taken with the drawing.

BRIEF DESCRIPTION OF THE DRAWING

FIG. 1 is a cross sectional view and FIGS. 2(A), 2(B) and 2(C) are cross sections at A—A in FIG. 1.

DETAILED DESCRIPTION OF PREFERRED EMBODIMENTS OF THE INVENTION

Figure 1:
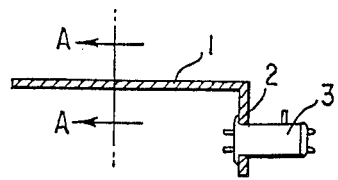
FIGS. 1, 2(A), 2(B) and 2(C) show a conventional head shell for pick-up arms where
Figure 2A:
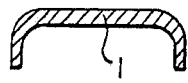
Figure 2B:
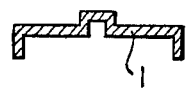
Figure 2C:
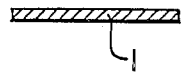
Figure 3:
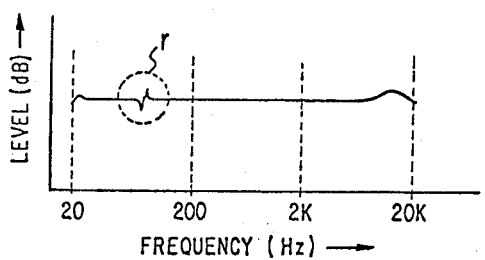
FIG. 3 is a frequency response graph of a conventional head shell.

Reference should be made to the drawing where like reference numerals refer to like parts.

Figure 4:
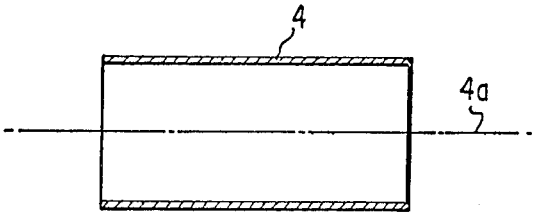
FIG. 4 is a cross sectional view of illustrative tubing from which the improved head shell of the subject invention may be made.

FIG. 4 is a cross section of tubing 4 typically made of boron fiber, glass fiber, FRP(Fiber Reinforced Plastic), carbon fibers, etc. Cylindrical tubing is illustrated but the tubing is not limited to this form, e.g. rectangular tubing can be used. Further, referring to the above-mentioned carbon fiber, etc., tubing 4 may be of any material that is light and formable by machine-pressing.

Figure 11:
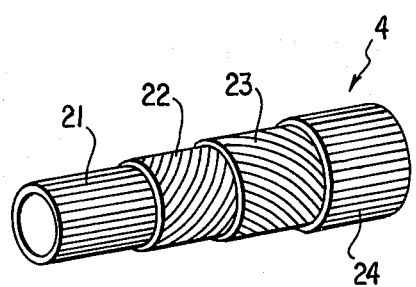
FIG. 11 is a perspective view of the tubing used in the shell of FIGS. 5, 6 and 7.
Figure 12:
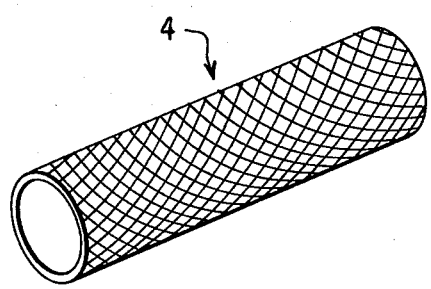
FIG. 12 is a perspective view of another tubing used in the shell of FIGS. 5, 6 and 7.

As shown in FIGS. 11 and 12, the tubing 4 is made by winding carbon fiber around a roller (not shown in the diagram). The tubing of FIG. 11 consists of the first layer 21 (the direction of the fiber is axial), the second layer 22 wound spirally on the first layer 21, the third layer 23 was transverse-directional spirally on the second layer 22, and the fourth layer wound as the first layer 21 on the third layer 23. Enough bending and torsional strength can be obtained by using prepregnated sheet as FIG. 11, which takes advantage of linearity of fiber. FIG. 12 shows another tubing consists of knitted carbon fiber. This tubing is not so strong as that of FIG. 11, because linearity of fiber is not so well-utilized in this case. The tubing 4 thus made is impregnated with epoxy resin or other thermosetting resin by vacuum bag method, etc.

Figure 5:
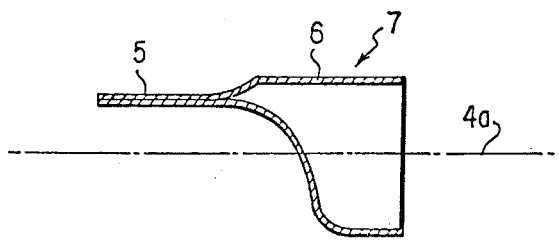
FIG. 5 is a cross sectional view of an illustrative, partial head shell shaped from the tubing of FIG. 4.
Figure 6:
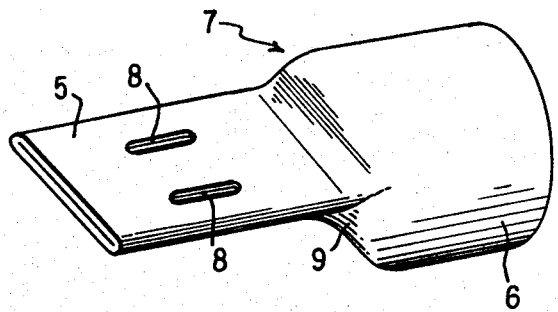
FIG. 6 is a perspective view of the shell of FIG. 5.
Figure 7:
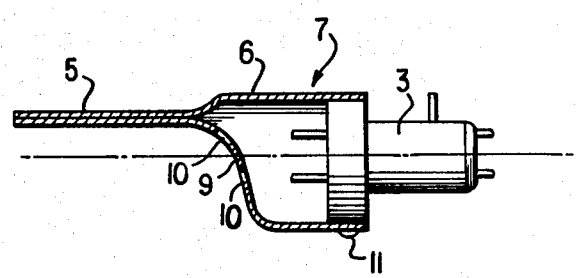
FIG. 7 is a partial cross sectional view of an illustrative complete head shell in accordance with the invention.

As shown in FIGS. 5 and 6, a flat part 5 for mounting the cartridge is formed by machine-pressing together a part of tubing 4 thus forming a shell frame 7 comprising flat part 5 and a remaining tubular part 6. Since a cartridge (not shown in the diagram) is to be mounted on the under side of flat part 5, it is desirable to form a flat part such that it is removed from axis 4a toward the circumference of tubing 4. Cartridge mounting holes 8 may be perforated in flat part 5 and terminal installation holes 10 may be punched on the wall 9 formed by the machine-pressing. Connector 3 may be mounted at the opening of remaining tubular part 6 by a screw 11, etc.

When a head shell for pick-up arms is employed in accordance with this invention, the flat part for mounting the cartridge is formed by machine-pressing a part of a tubing and the connector is mounted at the opening of the remaining tubular part. Thus, the flat part is formed continuously from the remaining tubular part as one-piece like an extension of a pipe. Consequently, the bending rigidity and the torsional rigidity in view of the connector are increased. Thus the occurrence of partial resonance can be prevented to thereby improve sound quality.

In addition, since the head shell is constructed such that a connector is mounted at the opening of the remaining tubular part, a large perforation or the like for the mounting thereof is not necessary. Hence, a greater amount of mechanical strength can be retained. The assembling is also simple. Futhermore, the manufacturing process involves only the cutting of long tubings obtained by extruding, drawing, etc. into tubular pieces of predetermined length and forming by machine-pressing. Thus, uniform head shells are produced in large quantities which allows a major cut in cost.

Figure 8:
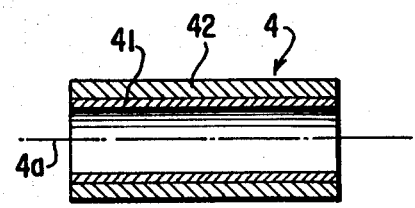
FIGS. 8 and 10 are cross sectional views illustrating a modified head shell in accordance with the invention.
Figure 9:
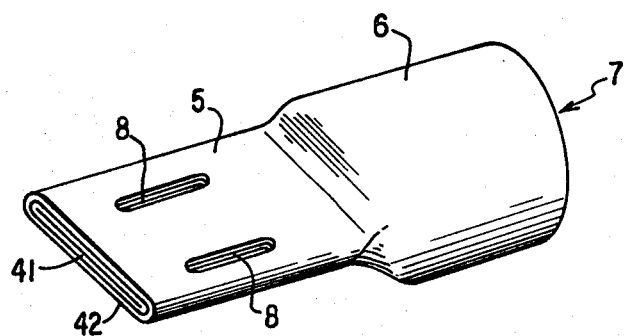
FIG. 9 is a perspective view of the head shell of FIGS. 8 and 10.
Figure 10:
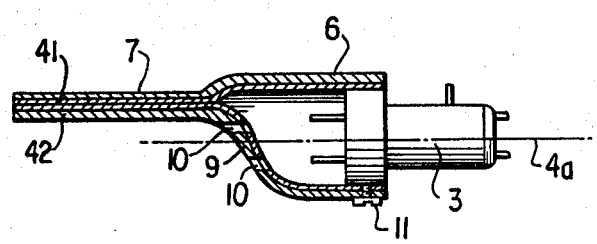
Figure 13:
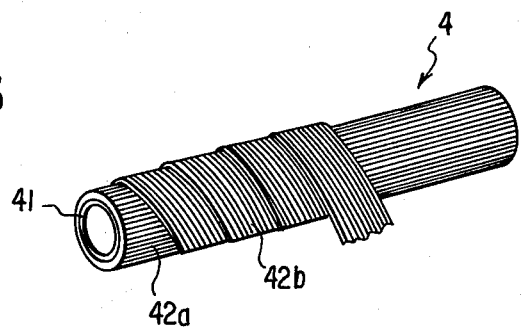
FIG. 13 is a perspective view of the tubing used in the modified head shell of FIGS. 9 and 10.

In FIGS. 8-10 is illustrated a modified head shell in accordance with the invention. As shown in FIG. 8, the tubing 4 of this embodiment consists of tubular base 41 made of any light and formable material such as light alloys of aluminum, titanium, magnesium, etc., and fiber layer 42 made of carbon fiber, boron fiber, glass fiber, FRP, etc. on the tubular base 41. The fiber layer 42 can be single layer, or laminated with different fiber-direction as shown in FIG. 13, where the first fiber layer 42a is formed axially and the second fiber layer 42b is wound spirally on the first fiber layer 42a. The tubing 4 thus made is impregnated same as aforementioned embodiment. Flat part 5 for mounting a cartridge is formed by partially machine-pressing a part of tubing 4 as indicated in FIG. 9. Thus, the flat part and remaining tubular part 6 comprise the shell frame 7 where cartridge mounting holes 8 may be perforated on flat part 5.

When a head shell for pick-up arms based on the embodiment of FIGS. 8-10 is employed, the advantages previously discussed for the embodiment of FIGS. 1-7 are obtained.

What is claimed is:

1. A head shell for pick-up arms comprising
   a flat part for mounting a phonograph cartridge formed by machine-pressing one end of a tubular member comprising a material selected from the group consisting of boron fiber, glass fiber, fiber reinforced plastic and carbon fiber so that an opening remains at the other end; and
   an electrical connector mounted at the opening of the remaining tubular part adapted for connection to a pick-up arm.

2. A head shell as in claim 1 where the flat part is removed from the axis toward the circumference of the tubular member.

3. A head shell as in claim 1 including a tubular base disposed inside said tubular member.

4. A head shell as in claim 3 where said tubular base is made of a different material than that of the tubular member.

5. A head shell as in claim 1 where said tubular member is cylindrical in cross section.

* * * * *